Aug. 30, 1949.  O. HADWIGER  2,480,325
BOWLING ALLEY SANDER
Filed June 11, 1946  8 Sheets-Sheet 1

INVENTOR
Oscar Hadwiger
By
Egan, McCallister & Miller
his attorneys

Aug. 30, 1949.　　　O HADWIGER　　　2,480,325
BOWLING ALLEY SANDER
Filed June 11, 1946　　　　　　　8 Sheets-Sheet 3

Patented Aug. 30, 1949

2,480,325

UNITED STATES PATENT OFFICE 2,480,325

BOWLING ALLEY SANDER

Oscar Hadwiger, Pueblo, Colo.

Application June 11, 1946, Serial No. 675,979

10 Claims. (Cl. 51—174)

This invention relates to sanding equipment, and more particularly, to floor sanders. One phase of the invention pertains to floor sanding equipment suitable for precision work such as in connection with the conditioning of bowling alleys.

Although floor sanders of various types have been in use heretofore, I have found that as a general rule they have not been satisfactory for so-called precision work. For example, the American Bowling Congress has a minimum tolerance requirement of .040 inch as to bowling alleys. I have also found that tolerance limitations have become more difficult to meet due to the lack of highly skilled operators.

And, it has been an object of my invention to provide a new and improved sander machine.

A further object has been to devise new and improved sanding technique such that better tolerances may be assured even with relatively unskilled labor.

A further object has been to devise a sander that is substantially automatic in operation and that will have an improved accuracy of cut.

A still further object has been to provide a sander of improved overall efficiency.

A still further and more limited object has been to devise a machine capable of effectively sanding large floor areas.

These and many other objects will appear to those skilled in the art from the embodiments chosen for the purpose of illustration and from the appended claims.

In the drawings:

Figures 11, 12, and 13 are side or longitudinal sectional views taken along the line XI—XI of Figure 9; Figure 11 shows drive mechanism in a neutral position; Figure 12 shows the drive mechanism connected to move the machine forwardly and Figure 13 shows it connected to move the machine backwardly;

This application is a continuation-in-part of my application Serial No. 599,253, entitled "Bowling alley sander" and filed June 13, 1945, now abandoned.

In accordance with my present invention, I have provided a sanding machine capable of somewhat general purpose utilization, but which is so constructed and arranged that precision sanding can be effected as required in connection with bowling alleys, for example. A machine constructed in accordance with my invention can easily meet and surpass the standards of the American Bowling Congress; I have found that a tolerance of, for example, .005 inch may be maintained by a relatively unskilled operator. I have devised a machine that is substantially fool-proof from the standpoint of eccentricities of a particular operator and that is capable of speed operation and of greatly improved accuracy of cut. To effect these and other results such as set forth in the objects of my invention, I have provided a machine which has a positive four-wheel drive and may be driven forwardly or backwardly as desired at a definite set speed without requiring the operator to do anything but control the driving mechanism and to see that the apparatus is started properly.

In carrying out my invention, the apparatus is provided with means for leveling or adjusting the relative height of the floor wheels of a sander frame as determined by any suitable means, such as spirit level. I mount a suitable driving motor and clutch and drive control mechanism on a main or carriage frame of the machine and provide a secondary frame which is pivoted on the main frame and supports the sander frame which carries a pair of oppositely driven sander belts that extend transversely of the machine. The sander belts are driven through the clutch mechanism in such a manner that at least one support roller for each sander belt is positively driven in an opposite direction with respect to the support roller of the other sander belt. The belts are suitably tensioned and guided in such a manner that they will be kept free from overriding each other and will remain on supporting rollers during the sanding operation.

The driving mechanism as driven by the motor, is actuated to drive all four floor wheels of the main frame and may also simultaneously drive the sanding belts in opposite directions. A control mechanism is operably associated with driving connections for raising and lowering the secondary or pivoted frame, and thus, the tertiary or sander frame which is carried thereby in such a manner that floor wheels will be disconnected when the sander is raised off the floor surface. In other words, the control mechanism moves the clutch to a neutral position when the sander frame is raised off the floor surface. By moving the control mechanism to one side of the neutral position, the sander is moved into an operative position with the floor surface, and the carriage floor wheels are actuated to move the apparatus forwardly; by moving the control mechanism to the other side of the neutral position, the sander is moved to an operative position with the floor surface and the floor wheels are actuated to move the apparatus backwardly.

By employing a four-wheel drive, I provide substantially uniform traction for the machine so that minimum guiding effort is required of the operator once the machine is started; this type of drive also prevents the machine from slipping on the floor surface or from moving to one side or the other out of proper aligned movement. I also provide a balanced sanding action by employing transversely extending sanding mechanism which, as above pointed out, consists of two parts which are driven in opposite directions transversely of the machine and preferably at the same rate of speed. In this way there is a definite balancing of the forces involved and no tendency for the machine to move to one side or the other during the sanding operation. In other words, the machine will move in a substantially straight line longitudinally once its operation is started, unless diverted manually by the operator.

Referring particularly to the embodiment of my invention shown in Figures 1 to 13, inclusive, the main frame or support carriage or platform 5, see particularly Figures 1, 2, 9, and 10, is provided with transversely spaced apart depending pairs of bracket arms 6 that are located adjacent front and rear ends thereof. Each transverse pair of depending bracket arms 6 journals an axle shaft, see 7a and 7b of Figures 2, 7, and 8, having floor wheels 8, see Figures 2, 3, and 11, secured thereon at opposite ends thereof for moving the frame 5 along the floor surface.

Figures 1, 14, 15:
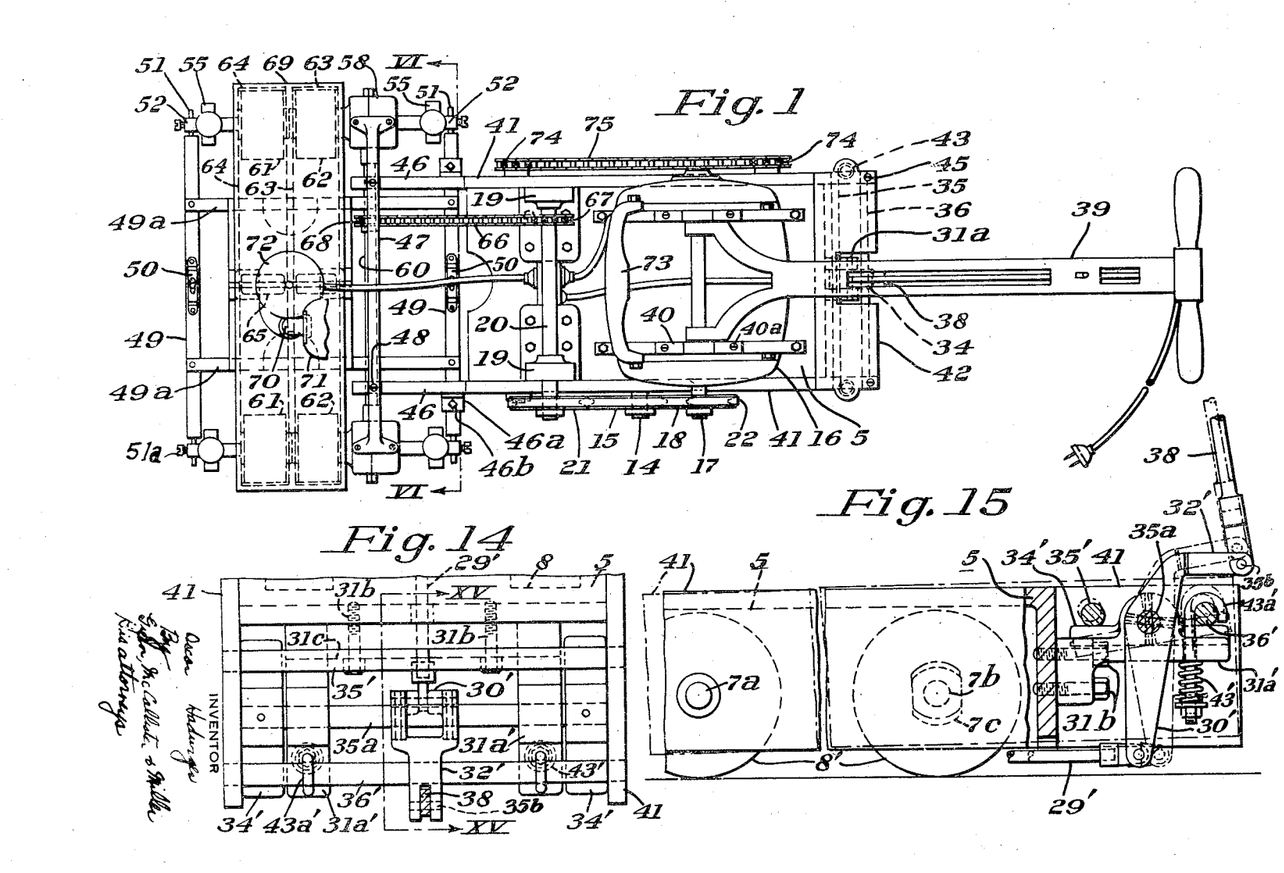
Figure 1 is a top plan view of one embodiment of a sanding machine chosen to illustrate my invention.
Figure 14 is an enlarged rear or transverse end view similar to Figure 3, but showing details of a modified control apparatus.
Figure 15 is an enlarged side view in elevation and partial section of the modification of Figure 14 and may be compared with Figures 11, 12, and 13 of the embodiment of Figure 1.
Figures 2, 2A, 2B, 6A:
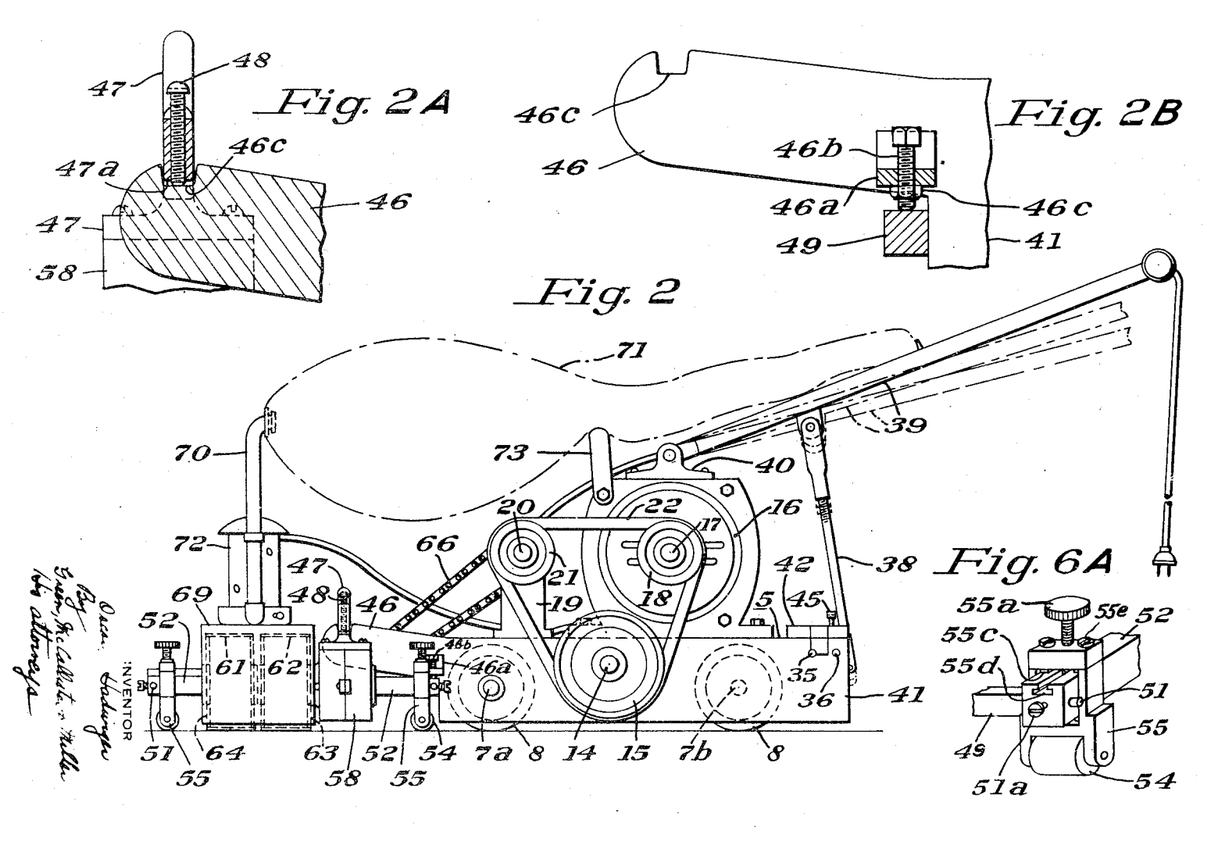
Figure 2 is a side view in elevation of the machine of Figure 1.
Figures 2A and 2B are enlarged fragmental details in partial section of the apparatus shown in Figure 2.
Figure 6A is an enlarged perspective detail of the apparatus of Figure 6.
Figure 3:
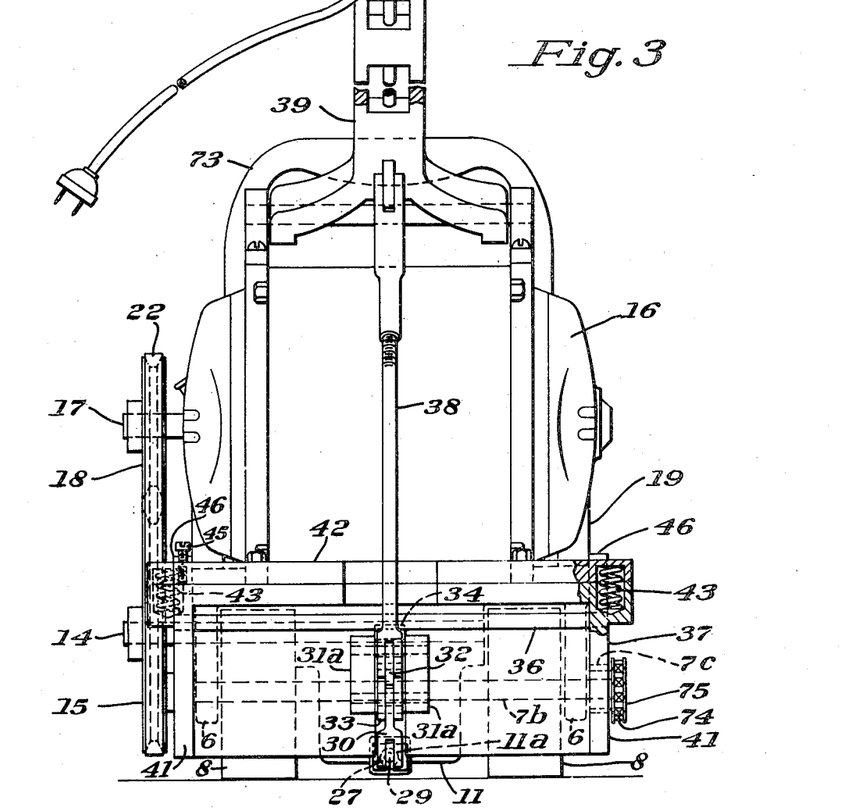
Figure 3 is an enlarged rear or transverse end view in elevation and partial section of the apparatus of Figures 1 and 2.
Figure 4:
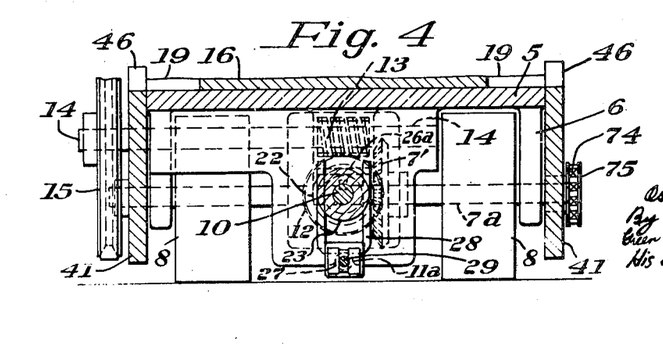
Figure 4 is a transverse section in elevation taken along the line IV—IV of Figure 12.

As shown particularly in Figures 1, 2, and 3, a motor 16 having a drive shaft 17 and a pulley wheel 18 keyed thereto drives pulley wheels 15 and 21 by means of a belt 22. The pulley wheel 21 is keyed to a shaft 20, see Figures 1 and 2, which drives the sander belts 63 and 64. The sander drive shaft 20 is journaled within upstanding brackets 19 that are bolted to the carriage 5, see Figure 1. The pulley 15 is keyed to a secondary drive shaft 14 which actuates the wheels 8 to move the carriage frame 5 along the floor, see particularly Figures 2, 9, 10, and 11. The secondary drive shaft 14 is journaled within a depending gear box or casing 11 of the frame 5, see Figures 9 and 10. A worm 13 is splined on the shaft 14 within the gear box 11 and meshes with a worm pinion 12 that is splined to a tertiary drive shaft 10 that extends longitudinally of the main carriage frame 5.

Figure 9:
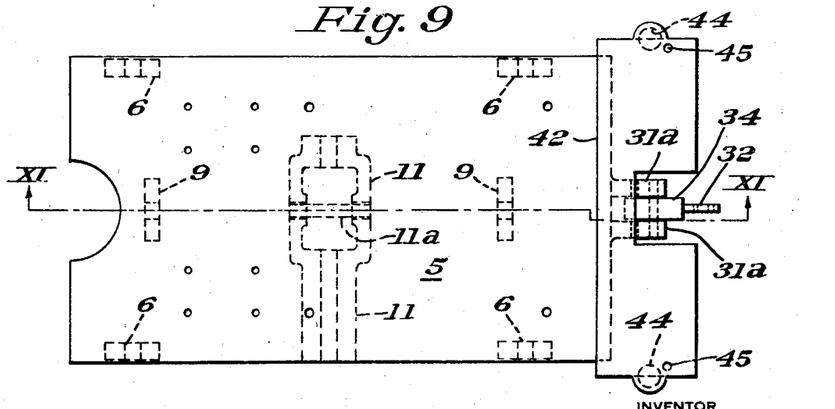
Figure 9 is an enlarged top plan view of a main support carriage frame of the embodiment of Figure 1.
Figure 10:
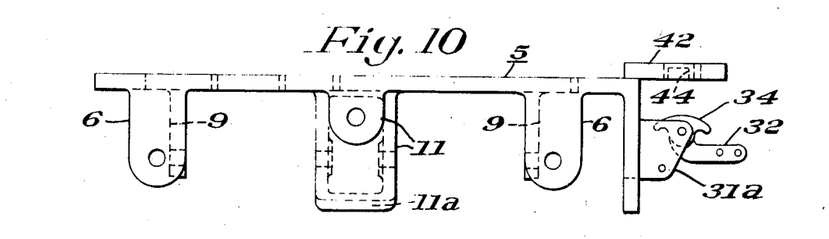
Figure 10 is a side view in elevation of the frame of Figure 9.
Figure 11:
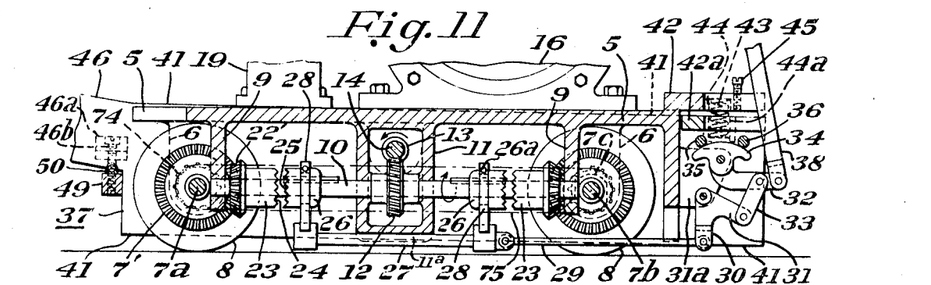
Figure 12:
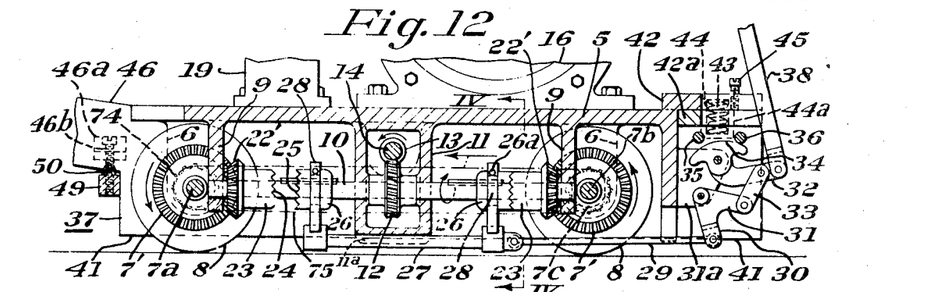
Figure 13:
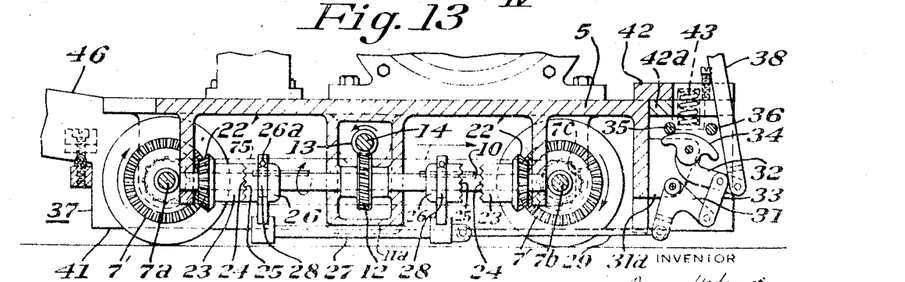

As shown particularly in Figures 11, 12, and 13, the tertiary drive shaft is centrally journaled within the gear box 11 and extends longitudinally on opposite sides therefrom into journal mounts within a centrally-positioned longitudinally-spaced apart pair of depending lugs 9, see also Figures 9 and 10. Clutch halves 26 are slidably keyed on each extending end of the shaft 10. As shown particularly in Figure 11, each clutch half 26 is connected by a yoke 27 having forked arms 28 which are secured to the clutch halves 26 by set screws 26a. It will be noted that the gear box 11 is slotted at 11a to provide a slidable guide for the yoke 27. Clutch halves 26 of each two part clutch are provided with teeth 25 which are adapted to mesh with teeth 24 on a cooperating clutch half 23. Each clutch half 23 is rotatably mounted on an end of the shaft 10 and has helical pinion 22' secured thereto for rotation therewith on the shaft 10. Each helical pinion 22' in turn meshes with a pinion gear 7'. The gears 7' are splined to the shafts 7a and 7b.

It will be seen from Figure 11 that the pair of clutch halves 26 are so constructed and arranged that they may be moved to a neutral position, to disconnect the drive connections of the motor from the clutch halves 23. As shown in Figure 12, the right hand pair of cooperating clutch halves may be engaged and the other or left hand pair disengaged to drive the wheels 8 of the frame forwardly; and, as shown in Figure 13, the other or left hand pair of clutch halves may be engaged and the right hand pair may be disengaged to drive the wheels backwardly. That is, when the clutch halves 23—26 are in the relationship shown in Figure 12, the back (right hand) pair of wheels are positively driven to move the machine forwardly while the fore (left hand) pair of wheels are disconnected from the driving mechanism, and thus, follow the direction of movement of the rear set. In the operative relation shown in Figure 13, the fore pair of wheels are driven backwardly to drive the main frame in such direction and the rear set of wheels are disconnected and follow the fore pair in such direction of movement.

Figure 7:
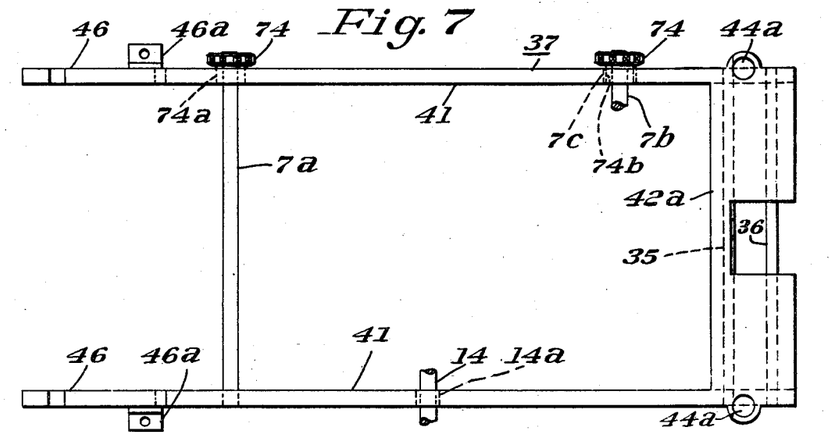
Figure 7 is an enlarged top plan detail of a pivoted or secondary carriage frame of the embodiment of Figure 1.
Figure 8:
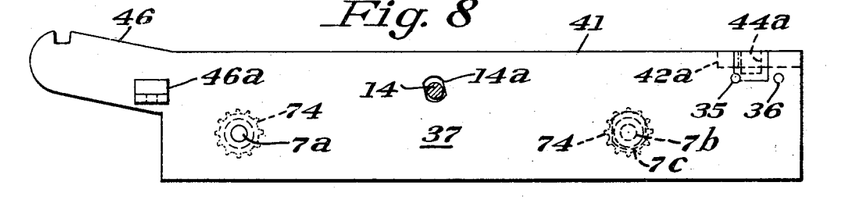
Figure 8 is a side view in elevation of the frame of Figure 7.

As shown particularly in Figures 1, 7, and 13, wheel drive shafts 7a and 7b extend beyond one side of the main frame 5 and of the secondary frame 37 and have chain sprockets 74 keyed thereon which mesh with a common drive chain 75. Thus, regardless of which pair of floor wheels 8 are driven, the other pair will be positively driven through such chain sprocket arrangement in the same direction to in effect provide a four-wheel drive.

As shown particularly in Figures 1, 2, 2a, 2b, 7, and 8, I have provided a secondary or pivot carriage frame 37 which is mounted on the fore wheel supporting shaft 7a and pivots thereabout. The fore or left hand sprocket 74, see Figure 7, has a collar 74a pivotally supporting one side arm 41 of the secondary frame 37 while the other end of the shaft 7a pivotally supports the opposite side arm 41. The collar 74b of the rear or right hand sprocket 74 extends through a slot 7c in the first-mentioned side arm 41 to permit the frame 37 to move about its pivot shaft 7a. It will be noted that the shaft 7b has a shorter length than shaft 7a as the latter extends at one end beyond the bracket 6 of the main frame to pivot one of the side arms 41 of the secondary frame 37. The secondary frame 37 has a pair of longitudinally extending side arms 41 that at their rear ends have a transversely extending connecting member 42a. The member 42a is positioned beneath a transverse connecting member 42 of the main frame, see Figures 1, 9, 10, and 11.

To adjust the pivoted relationship between the main carriage frame 5 and the pivoted or secondary carriage frame 37 whose side arms 41 are located outside of the frame 5, I provide a control arm or connecting rod 38 which is pivotally connected to an operating or control handle 39, see Figures 1 and 3. The handle 39 has a bifurcated end pivotally connected to a mount 40 secured by set screws 40a to the top of the motor casing 16. As shown particularly in Figures 1, 2, 7, 8, and 11, the side arms 41 of the pivot frame 37 carry a pair of spaced apart and transversely extending cam rods 35 and 36 which are rigidly secured thereto and are positioned in an operative relationship with opposite cam faces of a cam 34. The cam 34 is pivoted on bifurcated mount 31a that extends backwardly from the main frame 5, see Figures 9, 10, and 11. The cam 34 has an extending arm 32 which is pivotally connected to the control arm 38 in order to move the cam 34 from a neutral position such as shown in Figure 11, to one of the operating positions shown in Figures 12 and 13. That is, opposite face cams of the cam 34 contact the rods 35 and 36 to raise them and the rear end of the pivoted frame 37 about the pivot shaft 7a and thus lower the front end of the frame 37. In this manner, a tertiary or sanding frame 49—49a which is carried on the front end of the extension 46 of the arms 41 is lowered to move the sander into an operative position with respect to the floor surface.

I have provided set screws 45 which are mounted in the transverse member 42 of the carriage frame 5 to extend downwardly towards the transverse member 42a of the pivoted frame 37 to adjust the clearance between members 42a and 42, and thus, to adjust the amount of pivot movement of the frame 37 as effected by the cam 34 and the rods 35 and 36.

As shown particularly in Figures 3, 7, 8, 9, 10, and 11, the cross members 42 and 42a are shaped to provide side extension housings having apertures 44 and 44a at opposite ends thereof to receive compression springs 43 thereon. The springs 43 normally tend to lower the rear end of the pivoted frame 37 away from the main frame 5 to the position shown, for example, in Figure 11, but are compressed when the cam 34 moves to one of the positions shown in Figures 12 and 13, to raise the rear end of the pivot frame 37 and lower its front end.

To simultaneously raise and lower the pivot frame 37 and connect and disconnect the clutch member 23—26, I provide connecting links 33 and 31 which are pivotally connected to the arm 32 of the cam 34 and to one end of the clutch yoke operating rod 29. The U-shaped connection link 31 is pivotally positioned on the mount 31a. The rod 29 is pivotally connected at its other end to the clutch yoke 27.

In Figures 14 and 15, I have shown a modified arrangement for raising and lowering the pivot frame 37 and for actuating the clutch mechanism. Parts which are similar to those of the previously described embodiment have been indicated by prime suffixes. In this arrangement, I have likewise provided transversely extending rods 35' and 36' which are secured within side arms 41' of the pivoted frame and are adapted to be engaged and raised and lowered by a pair of spaced apart cams 34'. A mount bracket consisting of a pair of spaced apart side arms 31a' and a transversely extending connecting part 31c is removably secured to the front of the carriage frame 5 by bolts 31b. Hold-down bolts 43a' are loosely mounted to extend through the arms 31a and to latch over the rear transversely extending cam rod 36'. The bolts 43a' are normally forced downwardly by the resiliency of compression springs 43' that are removably and adjustably mounted on extending ends of each bolt by a nut and washer, see Figure 15.

It will be noted that the springs 43' abut the lower face portions of the mounting arms 31a' and thus normally tend to lower the rear end of the frame 37, and thus, raise front ends of the side arms 41 thereof above the pivot shaft 7a. The control arm or connecting rod 38 for the handle 39 is pivotally connected within bifurcations at one end of a control lever 32' that is secured adjacent its other bifurcated end to the control shaft 35a by pins (as shown by broken lines in Figures 14 and 15) centrally thereof for actuating it and its associated pair of spaced cams 34' to raise and lower the rods 35' and 36', and thus, to raise and lower the pivoted frame 37 and its associated side arms 41. The inner end of the control or operating lever 32' is also bifurcated and is pivotally connected to a rod 29' which, like the rod 29 of the embodiment of Figure 11, is operably connected to the yoke 27 of the clutch halves 26. In this embodiment, the cam action is effected adjacent both sides of the side arms 41, rather than centrally as in the case of the embodiment of Figures 1 to 13, inclusive.

Figure 6:
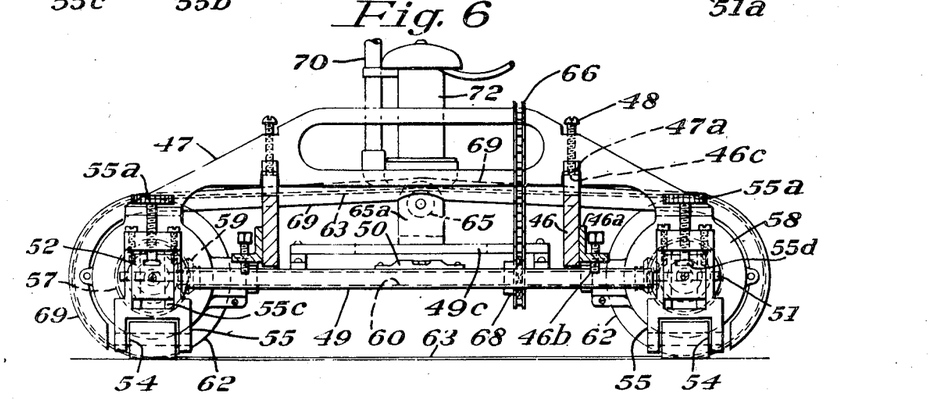
Figure 6 is an enlarged transverse view in elevation and partial section taken along the line VI—VI of Figure 1.

As shown particularly in Figures 1, 2, 2a, 2b, 6, 7, and 8, the side arms 41 of the pivoted frame 37 are provided with front extension portions 46 and sidewise extending adjustment lugs 46a. Notched portions 46c of the extending arms 46 are adapted to latch under and within slots 47a of an arched transverse member 47 of the sanding frame 39—44a, see Figure 6. The arched member 47, see Figures 2 and 6, is removably mounted on gear housings 58 of the sander frame. Threaded adjusting screws 48 extend downwardly through the member 47 and into the notches 47a to abut against notches 46c of the extension portions 46 of the pivoted frame side arms. In a similar manner, threaded adjusting bolts extend through the side brackets 46a to abut the rear cross member 49 of the sanding frame. In this manner the extension arm portions 46 of the pivoted frame 37 can be securely held in a desired adjustable connected relationship with respect to the sanding frame 49—49a.

As shown particularly in Figures 1, 2, 5, and 6, the sanding frame consists of spaced apart transverse members 49 having spirit levels 50 mounted thereon, longitudinally extending connecting members 49a, and axle supporting members 52 which are slotted at their ends to adjustably receive reduced ends 51 of the transverse members 49. The members 52 are secured to the members 49 by set screws 51a. A plate 49c is securely mounted on the longitudinal members 49a, see Figures 5 and 6, and carries a pair of roller mounts 65a which rotatably carry sander belt idler rollers 65.

Figure 5:
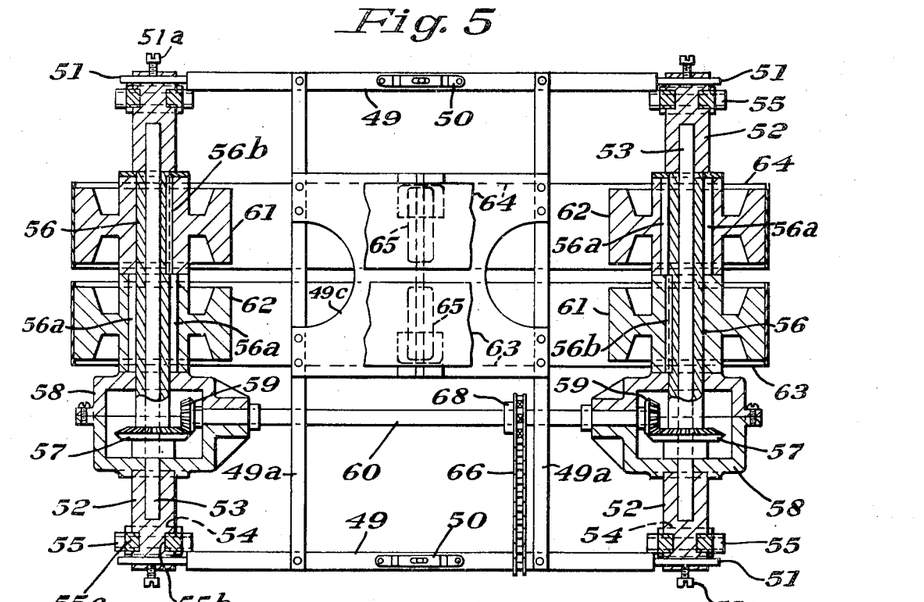
Figure 5 is an enlarged top plan view in partial section showing a sander frame of Figure 1.

As shown particularly in Figure 5, a drive chain 66 which is actuated by sprocket 67, see Figure 1, and the motor 16 meshes with a sprocket gear 68 feathered on a transversely extending sander drive shaft 60. The drive shaft 60 is journaled at opposite ends within gear boxes 58 and has beveled pinions 59 feathered thereon and meshing with pinion gears 57 feathered on roller driving shafts 53. The shafts 53 are journaled within the longitudinally extending shaft supporting members 52 on each side of the frame and carry pairs of sander rollers 61 and 62.

On each side of the sander frame, belt driving rollers 61 are secured to the shafts 53 for rotation therewith by keys 56b. The adjacent idler belt supporting pulleys 62 on each side of the frame are rotatably journaled on the shafts 53 by roller bearings 56a. It will, thus, be seen that one pulley roller 62 of each side of the frame is in effect an idler pulley while the other 61 is a positively driven actuating pulley for the belts carried transversely of the sander frame. It will also be noted that the driving rollers 62 have a transversely staggered relationship to aid in equalizing driving forces. A transversely extending sander belt 63 is operably carried by one set of transversely aligned rollers 61 and 62 and a second transversely extending belt 64 is operably carried by a second set of transversely aligned rollers 61 and 62. It will be noted that the driving gear arrangement is such that the opposite driven pulleys 61 are actuated in opposite directions to produce an opposite direction of movement of their respective transversely extending belts 63 and 64.

Referring particularly to Figures 2, 5, 6, and 6A, the shaft supporting side members 52 are at each end provided with inwardly extending vertical slots 55b which are adapted to receive inwardly projecting lugs 55c of a floor caster or wheel mount 55. Each mount 55 is provided with spaced apart bifurcated arms at its lower end to rotatably receive floor casters or wheels 54 and at its upper end carries a threaded adjusting screw 55a. The adjusting screws 55a have outwardly offset lower ends rotatably extending into end slot or aperture 55d within the shaft mounting members 52 for vertically adjusting the relationship of the rollers 54 with respect to the floor surface in accordance with a proper level as indicated by the devices 50. As seen in Figure 6A, screws 55e removably secure a top piece which carries the adjusting screw 55a to mount 55. It will be noted that the sander frame is supported at its four corners in such a manner.

I have also provided a housing or closure 69 that extends transversely over and above the sanding belts 63 and 64 and the pulleys 61 and 62. The cover 69 has a slip fit on the longitudinally extending shaft support members 52 and is open into and carries a centrally located motor drive suction or vacuum unit 72. The vacuum unit 72 has an exhaust pipe 70 which is provided with a dust bag 71 for collecting dust and dirt particles and keeping them free of the floor area. The bag 71 may be removably mounted in the usual manner by spring clips so that it can be emptied from time to time.

Figure 16:
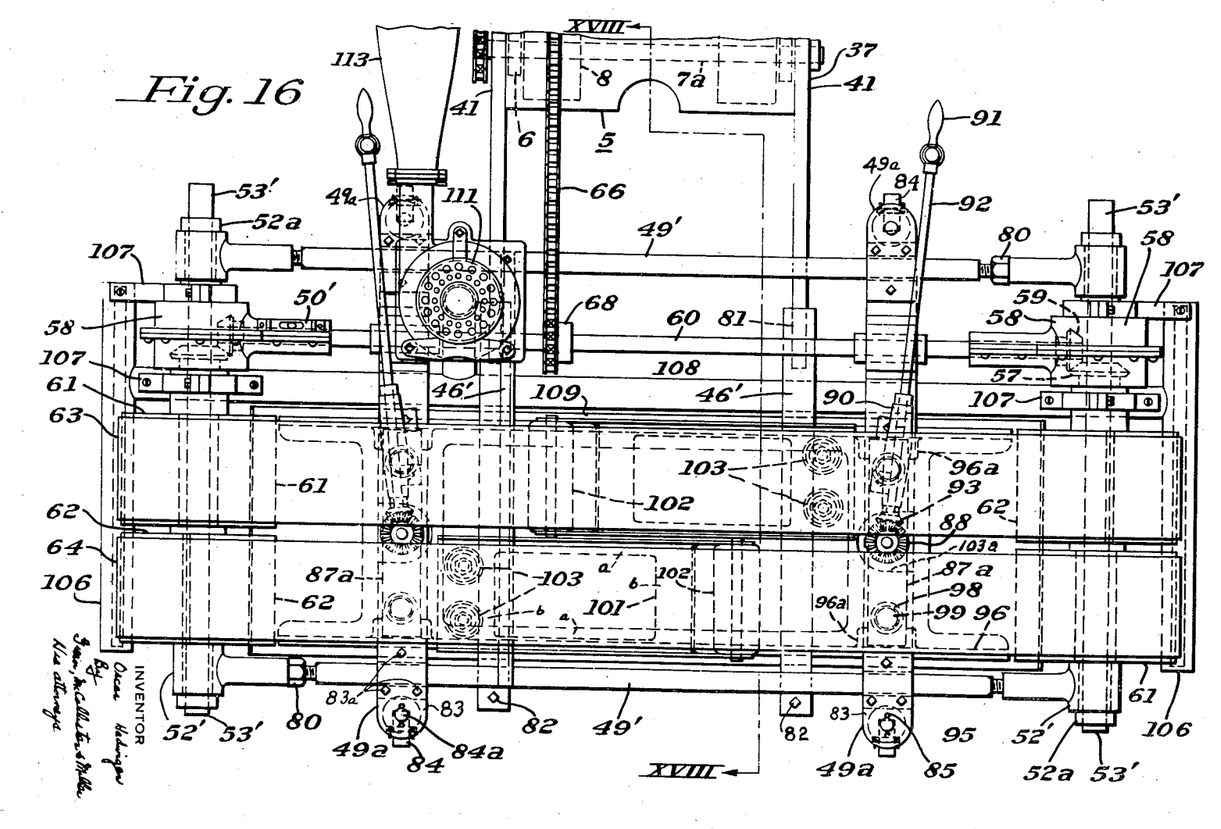
Figure 16 is an enlarged top plan detail taken transversely of the machine and showing another embodiment of a sanding frame arrangement and may be compared with the embodiment of Figure 5 which is at 180° with respect thereto.
Figure 17:
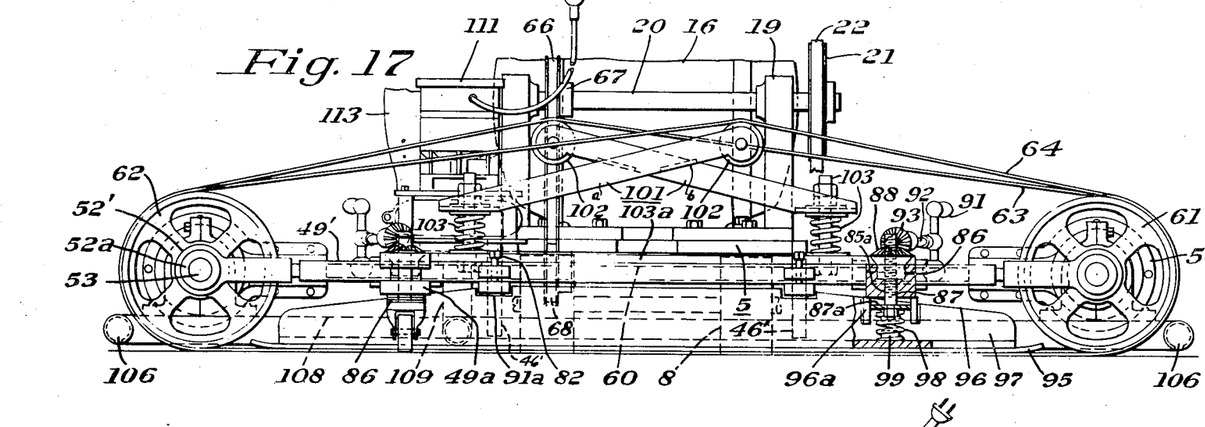
Figure 17 is a front end or transverse view in partial section of the embodiment of Figure 16.
Figure 18:
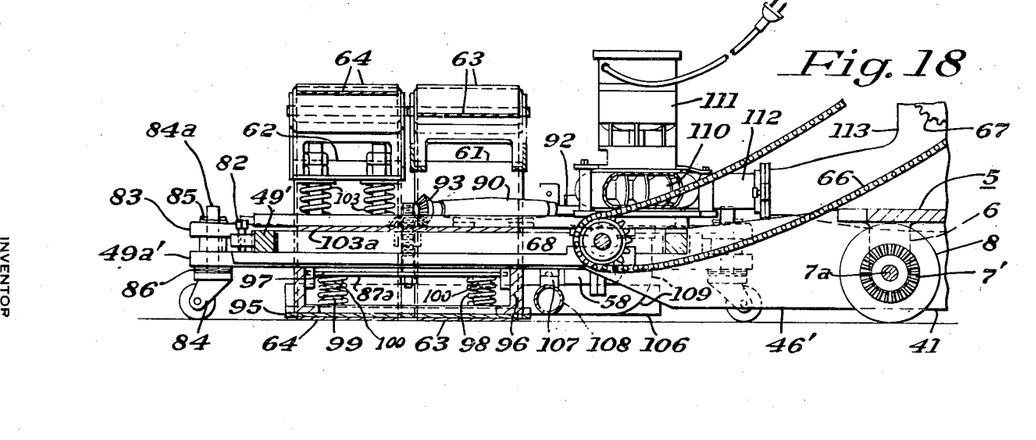
Figure 18 is a side sectional view taken along the line XVIII—XVIII of Figure 16.

In Figures 16, 17, and 18, I have shown another embodiment of a tertiary or sanding frame. In this embodiment, the belts and belt rollers and driving mechanism for them are mounted in the same general manner as described in connection with the embodiment of Figure 1. Exactly similar parts have been indicated by the numerals of the previous embodiment, while those that are slightly modified are indicated by prime suffixes; new or different parts are indicated by numerals beginning with 80. The axle shafts 53' for the sander belt rollers 61 and 62 extend outwardly through the ends of the shaft mounting members 52' in which they are journaled. I have also shown dust seal collars 52a at each end of the shafts 53' in abutment with the ends of the members 52'. The side members 52' are adjustably connected by transverse members 49' which are provided, as shown in Figure 16, with right or left hand threads at each end thereof and a lock-nut 80 at one end thereof.

I have also shown longitudinally extending members 46' which are slotted at their inner ends 81 to receive and engage extending portions 46' of the arms 41 of the pivoted frame 37. The portions 46', as shown particularly in Figures 17 and 18, are adjusted with respect to the sanding frame by threaded bolts 82 that extend outwardly from the front transverse frame member 49'. The portions 46' are preferably secured at their inner ends, see 81, as by welding, to form an extension of the side arms 41 of the pivoted frame 37. The adjusting bolts 82 like the screws 48 and bolts 46b of the embodiment of Figure 1, provide a predetermined desired relationship between the pivoted or secondary frame 37 of the machine and the sanding frame.

The sanding frame 49' also has central, longitudinally extending connecting members 49a' which are slotted out at each end thereof to securely receive the transverse members 49'. The extreme front end of each member 49a is provided with a separate top extension piece 83, see Figures 16 and 18, that is bolted thereon by three threaded bolts 83a. As shown in Figure 18, the spaced parts 83 and 49a' receive a pin 84a of a caster or floor wheel assembly 84. The caster assembly 84a is rotatably mounted to extend through the parts 83 and 49a' and is secured thereon by cotter pins 85 and shims or washers 86. Various size shims may be inserted to provide a desired level of the sanding frame as determined by a leveling device 50' which may be mounted on an extension of a gear housing 58, see the upper left hand corner of Figure 16. The spaced apart portions of the support for the caster assembly 84 prevent the latter from vertically pivoting about such support and hold it in its vertically adjusted position.

The longitudinal connecting members 49a' are provided with apertures 85a and 86, see Figure 17, receiving and supporting a threaded stud shaft 87 and a beveled pinion 88. The pinion 88 is rotatably mounted and internally threaded to adjustably receive a threaded upper end of the stud shaft 85a. The stud shaft 87 extends slidably downwardly through the aperture 85a. A housing 90, see Figure 17, is secured to each of the arms 49a' and carries a hand adjustment grip 91, an adjusting shaft 92 and a bevel pinion 93. The pinion 93 is feathered on the shaft 92 and meshes with the pinion gear 88 of the stud shaft 87 to vertically adjust the relationship of guide plate supporting springs 98.

I have provided a bottom plate skid or belt guide structure 95 having upwardly extending transverse flange members 96. The guide plate 95 is adapted to engage inner sides of lower portions of the sanding belts 63 and 64 adjacent the floor surface. The plate 95 is carried by the studs 87 which at their lower ends are non-rotatably bolted to a pair of projecting guide flanges 96a of the transverse members 96 of the plate 95. Compressible springs 98 are at one end securely mounted on lugs 99 extending upwardly from the plate 95 and on spaced lugs 100, see Figure 18, extending downwardly from the support pieces 97. The bottom plate 95 is thus flexibly-adjustably carried by the stud shafts 87 as the springs 98 may be adjusted by the hand grips 91 through the gear and stud shaft mechanism above described. In this manner, the sander belts are held along their bottom lengths in proper guided engagement with the floor surface to be sanded; the springs 98 may be adjusted to give a uniform tension on the sanding belts along their bottom lengths.

The upper portions of the sanding belts 63 and 64 are held tightly on their rollers 61 and 62 by tensioning means; each tensioning means comprises a frame 101 having spaced side arms a and spaced cross arms b and an idler roller 102 rotatably mounted on ends of the side arms a and engaging inner sides of the belts. As shown in Figure 17, the frames 101 extend in opposite directions for the two belts. Each frame at its lower end is adjustably mounted by a pair of spring and bolt assemblies 103 that project upwardly from a plate or platform 103a, the ends of which are secured as by welding to members 49a'. In this manner the bolts can be tightened down to provide any desired tension of the belt through the frame 101 and idler rollers 102. I also preferably adjust each of the two spring and bolt means 103 of each frame 101 in such a manner as to slightly slope the idler rollers 102 away from a center line representing the spacing between belts 63 and 64 to prevent one belt from overriding the other.

In this embodiment I have also shown a modified form of dust collecting device which comprises downwardly slotted side ducts 106 that are removably mounted on the shaft support side members 52' by projecting clamps 107. The side ducts 106 are at their inner ends connected to a common transversely extending duct 108 which in turn is connected to a discharge duct 109 that leads to suction vanes 110 of a motor driven vacuum device 111. Dust and dirt particles are discharged through an outlet exhaust pipe 112 into a removable dust bag 113.

In the last-mentioned embodiment it will be seen that the dust particles are collected adjacent outer longitudinal sides of the machine from the floor surface rather than from the top of the belts, as in the case of the embodiment of Figures 1 and 2, for example.

Although I have shown chain drive connections, belt or shaft drive connections may be employed in accordance with my invention. Although for the purpose of illustrating my invention I have shown examples of machines and modifications thereof, it will be apparent to those skilled in the art that other mechanisms may be employed in accordance with the principles of the invention and that adaptations, modifications, subtractions and additions may be made to the illustrated mechanism without departing from the spirit and scope of my invention, as indicated by the appended claims.

What I claim is:

1. A floor sanding machine comprising, a carriage frame, wheels operably mounted on said carriage frame and being constructed and arranged to move along a floor surface, a motor on said carriage frame, a sander frame movably carried by said carriage frame adjacent one transverse end thereof, lever means operably mounted on said carriage frame and connected to said sander frame, said lever means being constructed and arranged to raise and lower said sander frame with respect to the floor surface, means on said sander frame for adjusting limits of movement of said frame with respect to said carriage frame, driving means operably mounted on said carriage frame and constructed and arranged to move said carriage frame along the floor surface, two pairs of rollers rotatably mounted on said sander frame, each roller of each of said pairs being in a transversely spaced relationship with respect to the other roller of the same pair, a continuous sander belt operably mounted on each of said pair of rollers, a drive shaft operably connected to said motor and to each of said pairs of rollers, said drive shaft having connections for actuating one pair of said rollers in an opposite direction with respect to the other pair.

2. A floor sanding machine comprising, a carriage frame, axle shafts mounted adjacent opposite ends of said carriage frame, a pair of wheels operably mounted on each of said shafts adjacent opposite ends thereof and constructed and arranged to move along a floor surface, a motor mounted on said carriage frame, driving connections between said motor and at least one of said wheels for moving said carriage along the floor surface on said wheels, a sander, pivot means operably mounting said sander on said carrier frame, a rotatable axis of said sander being substantially transverse of the axes of said wheels, driving connections between said motor and said sander constructed and arranged to actuate said sander, means on said carriage frame constructed and arranged to raise and lower said sander on said pivot means with respect to the floor surface, and operative connections between said driving connection for said wheel and said raising and lowering means, said operative connections being constructed and arranged to operably connect said wheel to said motor when said sander is lowered with respect to the floor surface and to disconnect said motor when said sander is raised with respect to the floor surface, said operative connections being constructed and arranged to actuate said wheel in either a forward direction or in a backward direction when said sander has been lowered with respect to the floor surface.

3. A floor sanding machine comprising, a carriage frame, axle shafts rotatably mounted adjacent opposite ends of said carriage frame, a pair of wheels rotatable with and securely mounted on each of said shafts adjacent opposite ends thereof and constructed and arranged to move along a floor surface, a motor mounted on said carriage frame, a pair of clutches, one of said clutches being operably connected to one end of one of said axle shafts, the other of said clutches being operably connected to the same end of the other of said axle shafts, driving connections between said motor and one of said clutches for actuating its associated axle shaft in one direction, driving connections between said motor and other of said clutches for actuating its associated axle shaft in an opposite direction, means for moving each of said clutches into and out of engagement in such a manner as to alternately actuate said axle shafts in opposite directions, tie-in operating connections independent of said above-defined driving connections and between the opposite ends of each of said axle shafts constructed and arranged to drive both of said axle shafts in the same direction with respect to each other, a sander operably mounted on said carriage adjacent one end thereof and constructed and arranged to abut the floor surface, and driving connections between said motor and said sander for actuating said sander.

4. A floor sanding machine comprising, a carriage frame, axle shafts mounted adjacent opposite ends of said carriage, a pair of wheels operably mounted on each of said axle shafts adjacent opposite ends thereof and constructed and arranged to move along a floor surface, a motor mounted on said carriage frame, a pair of clutches operably carried by said carriage frame, each of said clutches having a pair of parts, the parts of each of said pairs being constructed and arranged to be moving into and out of operative driving relationship with respect to each other: one part of one of said clutches being operably connected to drive the wheels on one of said shafts, the other part of said clutch being operably connected to said motor; one part of the other of said clutches being operably connected to drive the wheels on the other of said shafts, the other part of said second-mentioned cltuch being operably connected to said motor; a yoke operably connecting the first-mentioned part of one clutch to the first-mentioned part of the other clutch in such a manner that the parts of one of said clutches may be in an operative driving relationship with respect to each other while the parts of the other clutch are out of an operative relationship with respect to each other, and also, in such a manner that the parts of both of said clutches may be simultaneously out of an operative driving relationship with respect to each other; lever means on said carriage frame operably connected to said yoke for moving the parts of each of said clutches into and out of an operative driving relationship with respect to each other, a sander frame movably mounted on said carriage frame adjacent one end thereof, means for adjusting limits of movement of said sander frame, two pairs of cooperating sander-belt-carrying-rollers rotatably mounted on said sander frame, a sander belt operably mounted on one of said pair of sander rollers, a sander belt operably mounted on the other pair of said sander rollers, said sander belts extending transversely of said carriage frame, lever connections between said lever means and said sander frame constructed and arranged to raise and lower said sander frame in accordance with the relationship between the pair of parts of each of said clutches, and driving connections between said motor and said pairs of sander rollers constructed and arranged to drive one pair of sander rollers in an opposite direction with respect to the other of said sander rollers.

5. A floor sanding machine comprising, a carriage frame, wheels rotatably mounted on said carriage frame and constructed and arranged to move along a floor surface, a motor on said carriage frame, a sander frame pivotally mounted on said carriage frame, a rotatable sander operably mounted on said sander frame and having driving connections to said motor, a clutch mechanism operably mounted on said carriage frame and connected at one end to at least one of said wheels for actuating it in one direction, said clutch mechanism being connected at its other end to said motor, cam means operably positioned on said carriage frame for raising and lowering said sander frame about its pivot mounting, pivot connections between said cam means and said clutch mechanism for moving it into and out of engagement, and a hand lever operably mounted on said carriage frame and pivotally connected to said cam means for operating it, a second clutch mechanism operably mounted on said carriage frame and adapted to be operably connected to another of said wheels for actuating it in an opposite direction, a pivot connection between said cam means and said second-mentioned clutch mechanism for moving said clutch mechanism into and out of operative connection with the other of said wheels, and link means between said first and second-mentioned clutch mechanisms for preventing both of said clutch mechanisms from being in engagement at the same time.

6. A floor sanding machine comprising, a carriage frame, wheels rotatably mounted on said carriage frame and constructed and arranged to move along a floor surface, a motor on said carriage frame, a secondary frame pivotally mounted on said carriage frame, a sander frame carried by said secondary frame, a sander operably carried by said sander frame, operative connections between said sander and said motor for actuating said sander, a pair of spaced apart rods mounted to extend transversely adjacent one end of said pivoted secondary frame, a cam mechanism having two cam faces, one of the cam faces being in operative association with respect to one of said rods, the other of said cam faces being in operative association with the second of said rods, said cam mechanism being pivotally mounted on said carriage frame, and lever means connected to said cam means for actuating it to raise the rods associated with the cam faces thereof to move said secondary frame about its pivot connection and thereby lower said sander frame.

7. A floor sanding machine comprising, a carriage frame, wheels rotatably mounted on said carriage frame and constructed and arranged to move along a floor surface, a motor on said carriage frame, a secondary frame having side arms pivotally mounted on said carriage frame and at a front end extending beyond said carriage frame, a sander frame mounted on the extending ends of said side arms, a sander operably mounted for rotation on said sander frame and operably connected to said motor for actuation thereby, a transverse member extending across said side members adjacent rear end of said secondary frame and carrying a pair of spaced apart rods, flexible means between said carriage frame and said transverse member for normally holding the rear end of said secondary frame in a lowered relationship with respect to said carrier frame, cam means pivotally mounted on said carriage frame and having cam faces arranged in an operative relationship with respect to said rods for raising them against force exerted by said flexible means, said cam means comprising a pair of spaced apart cam members operably mounted on a cam actuating rod extending transversely across and movably mounted on said carriage frame, and lever means operably connected to said operating rod for actuating said cam means to lower the front end of said secondary frame, a separable clutch operably connected between said motor and at least one of said wheels, and operative connections between said cam means and said clutch for moving said clutch into and out of engagement in accordance with the actuating of said cam means.

8. A floor sanding machine comprising a carriage frame, wheels rotatably mounted on said carriage frame and constructed and arranged to move along a floor surface, a motor mounted on said carriage frame, a sander frame carried by said carriage frame, a pair of rollers rotatably mounted on said sander frame, one of said rollers being mounted adjacent one transverse end of said sander frame, and the other of said rollers being mounted adjacent an opposite transverse end of said sander frame, a belt sander operably mounted for rotation on said pair of rollers and extending transversely of said sander frame, operating connections between said motor and each of said rollers constructed and arranged to rotate said rollers and said belt sander, a second pair of rollers rotatably mounted on said sander frame, one roller of said second-mentioned pair being in substantial axial alignment with one roller of said first-mentioned pair of rollers, the other roller of said second-mentioned pair being in substantial axial alignment with the other roller of said first-mentioned pair, a belt sander operably mounted for rotation on said second-mentioned pair of rollers and extending transversely of said sander frame, and operating connections between said motor and said second pair of rollers constructed and arranged to rotate said second-mentioned pair of rollers and their said sander belt in a direction opposite to the rotation of said first-mentioned pair of rollers and their said sander belt.

9. A floor sanding machine as defined in claim 8, wherein resilient means is mounted on said sander frame and is constructed and arranged to engage inner surface portions of said first and second-mentioned sander belts to hold each of them in a taut and separated relationship during rotation.

10. A floor sanding machine comprising, a carriage frame, axle shafts mounted adjacent opposite ends of said carriage frame, a pair of wheels operably mounted for movement along a floor surface on each of said shafts adjacent opposite ends thereof and constructed and arranged to move said carriage along the floor surface, a motor mounted on said carriage frame, driving connections along said carriage frame and between each of said axle shafts and said motor for actuating said axle shafts to move said carriage frame along the floor surface, a sander, a pivot means operably mounting said sander on said carriage adjacent one end thereof and being constructed and arranged to raise and lower said sander with respect to the floor surface, driving connections between said motor and said sander for rotating said sander as said wheels move said carriage along the floor surface, mechanism constructed and arranged to disconnect said first-mentioned driving connections when said sander is raised by said pivot means away from the floor surface, and means operably associated with said mechanism and constructed and arranged to reverse the direction of rotation of said axle shafts when said sander is in a lowered relationship with respect to the floor surface.

OSCAR HADWIGER.

REFERENCES CITED

The following references are of record in the file of this patent:

UNITED STATES PATENTS

| Number | Name | Date |
| --- | --- | --- |
| 426,862 | Ross | Apr. 29, 1890 |
| 867,620 | Taft et al. | Oct. 8, 1907 |
| 876,155 | Edlund | Jan. 7, 1908 |
| 895,497 | Pliske | Aug. 11, 1908 |
| 907,058 | Kraemer et al. | Dec. 15, 1908 |
| 1,021,497 | Woodruff | Mar. 26, 1912 |
| 1,198,026 | Hampton | Sept. 12, 1916 |
| 1,576,428 | Hadwiger | Mar. 9, 1926 |
| 1,760,832 | Jacobson et al. | May 27, 1930 |
| 1,857,564 | Olson | May 10, 1932 |
| 1,877,031 | Olson | May 10, 1932 |
| 2,279,782 | Fowler | Apr. 14, 1942 |
| 2,320,161 | Talboys | May 25, 1943 |

Certificate of Correction

Patent No. 2,480,325                                  August 30, 1949

OSCAR HADWIGER

It is hereby certified that error appears in the printed specification of the above numbered patent requiring correction as follows:

Column 6, line 39, for the word "above" read *about*;

and that the said Letters Patent should be read with this correction therein that the same may conform to the record of the case in the Patent Office.

Signed and sealed this 3rd day of January, A. D. 1950.

[SEAL]

THOMAS F. MURPHY,
*Assistant Commissioner of Patents.*